Dec. 12, 1967  R. M. BOND  3,357,278
APPARATUS FOR SHARPENING SAWS OR THE LIKE
Filed Oct. 19, 1965  2 Sheets-Sheet 1
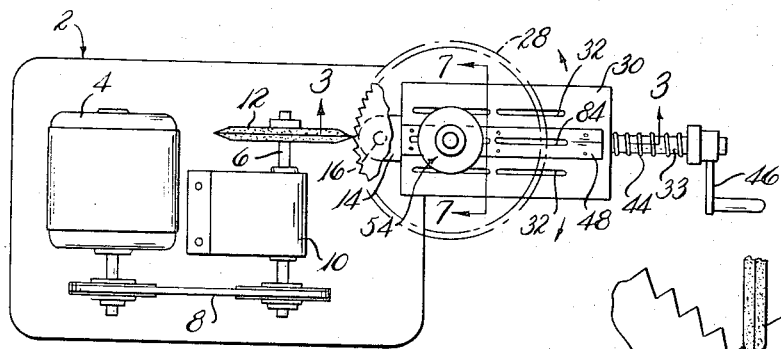
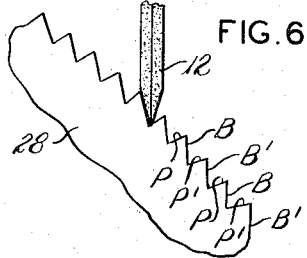
FIG. 6
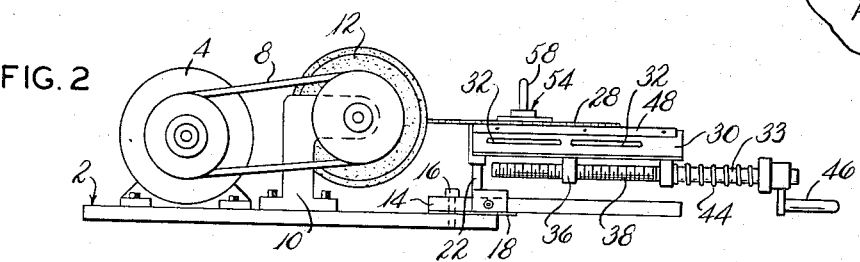
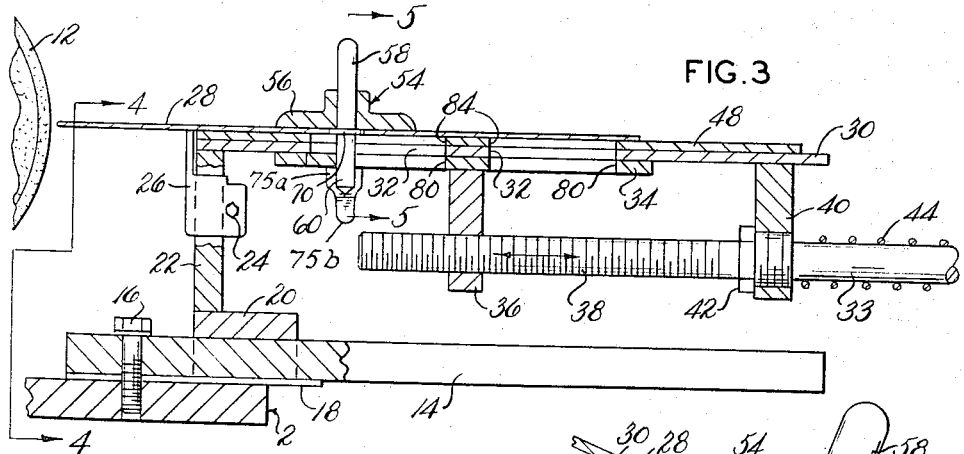
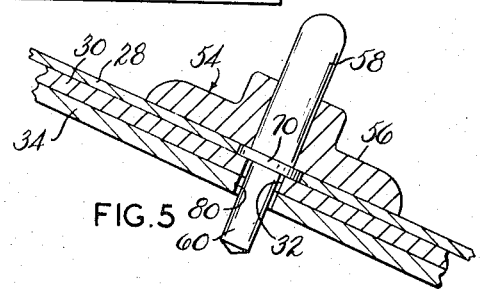
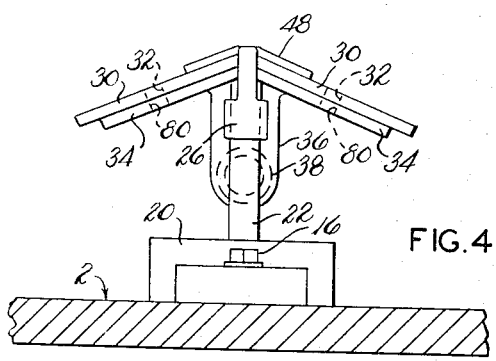
INVENTOR.
ROBERT M. BOND
BY Oldham & Oldham
ATTYS.

Dec. 12, 1967   R. M. BOND   3,357,278
APPARATUS FOR SHARPENING SAWS OR THE LIKE
Filed Oct. 19, 1965   2 Sheets-Sheet 2
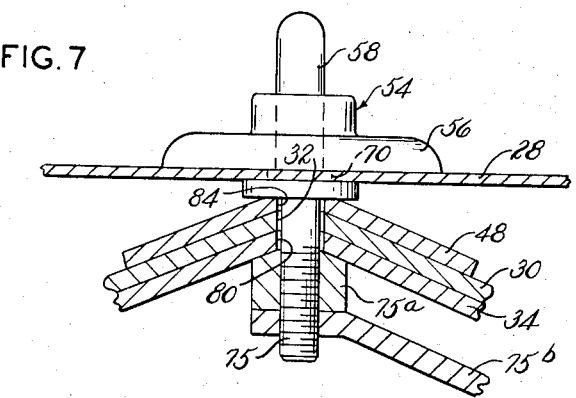
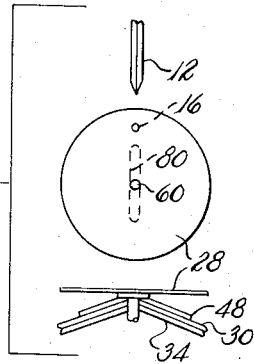
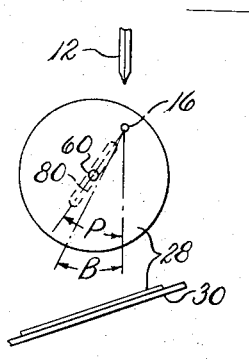
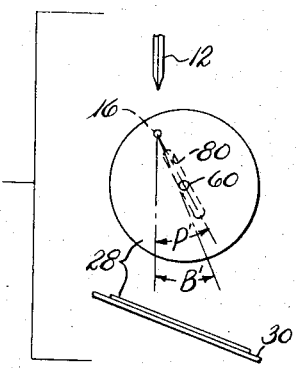
INVENTOR.
ROBERT M. BOND
BY Oldham & Oldham
ATTYS.

ered Dec. 12, 1967

United States Patent Office 3,357,278

Patented Dec. 12, 1967

3,357,278
APPARATUS FOR SHARPENING SAWS
OR THE LIKE
Robert M. Bond, 973 Shadybrook Road,
Akron, Ohio 44312
Filed Oct. 19, 1965, Ser. No. 497,634
7 Claims. (Cl. 76—43)

ABSTRACT OF THE DISCLOSURE

A disc saw sharpening apparatus comprised of a grinding wheel and support means associated with the wheel. The support means includes means to hold the disc saw to be sharpened in a plane either tilted right or left to the axis of the grinding wheel. Means are also provided which allows selective limited movement of the saw to be sharpened towards and away from the grinding wheel.

---

This invention relates to an apparatus for sharpening saws or the like, by means of a grinding wheel, and more particularly, includes quickly adjustable guiding mechanism to facilitate and insure an excellent sharpening operation.

Saw sharpeners heretofore known are too bulky, are not readily adjustable, cannot sharpen quickly enough to make it profitable for the individual, are not readily portable, and are expensive.

It is the general object of the invention to provide an inexpensive, more efficient, and more practical apparatus to sharpen saws, or the like, which apparatus is adapted to precisely position the tool to be sharpened in association with a grinder whereby the adjustments on the apparatus of the invention permit the user to quickly, effectively, and efficiently sharpen the teeth of the saw, or the like with precision, with a minimum of effort and time.

It is a further object of the invention to permit a relatively unexperienced person, to sharpen a saw, or the like because of a novel and readily adjustable guiding mechanism which permits the saw blade to be moved by fine control in relation to the grinding wheel, to thereby enable the user to do accurate work while sharpening the blade, with minimum chance for error.

It is a further object of the invention to place the motor means, driving the grinding wheel completely out of the work area around the grinding wheel. This achieves a distinct improvement over the art since earlier saw sharpening apparatuses generally only allowed sufficient work area on one side of the grinding wheel.

It is a further object of the invention to enable the user, by placing an auxiliary support on the angled support plate, to be provided with a horizontal plane on which he can place the saw, or the like, and round the saw.

The aforesaid objects of the invention, and other objects which will become apparent as the description proceeds, are achieved by providing an apparatus for sharpening disc saw including a bevel edge grinding wheel, means for rotating the wheel, support means for the disc saw providing for movement of the periphery of the saw into the grinding wheel, said support means including means to hold the saw in a first plane including the axis of the grinding wheel or in planes tilted right and left out of the first plane, means for adjustably limiting movement of the saw towards the grinding wheel, means pivotally mounting the support means on an axis substantially at right angles to the axis of the grinding wheel to provide for adjustment of a selected edge of a saw tooth into substantial parallelism or desired angle with the bevel edge of the grinding wheel, and means to retain the support means in the selected pivotal position.

For a better understanding of the invention reference should be had to the accompanying drawings wherein:

FIGURE 1 is a plan view of the invention in one preferred embodiment thereof;

FIGURE 2 is a side elevational view of the invention;

FIGURE 3 is an enlarged cross sectional view, taken substantially on line 3—3 of FIGURE 1, but with auxiliary support plate 48 removed;

FIGURE 4 is a cross-sectiona view taken along line 4—4 of FIGURE 3, but with the positioner pin 54 removed;

FIGURE 5 is an enlarged cross sectional view taken substantially on line 5—5 of FIGURE 3 of the positioner pin holding the saw to be sharpened to the support plate and the undercarriage;

FIGURE 6 is a schematic view of the grinding wheel and disc saw in one proper sharpening position;

FIGURE 7 is an enlarged, broken away, cross sectional view of the apparatus of the invention, taken substantially from lines 7—7 of FIGURE 1;

FIGURE 8 is a schematic plan view of the disc saw and the grinding wheel in proper relationship when the disc saw is to be rounded, and also shows in elevation the position of the saw and its support during this operation;

FIGURE 9 comprises schematic views like FIGURE 8 of the disc saw and the grinding wheel when the pitch of the saw teeth are to be sharpened; and FIGURE 10 comprises schematic views like FIGURES 8 and 9 of the disc saw and the grinding wheel when the bevel of the saw teeth are to be sharpened.

Although the apparatus of the invention is adapted to perform a variety of tool sharpening operations, it is primarily designed for the sharpening of disc saws and has been so illustrated and will be so described. In the form of the invention illustrated in FIGURE 1 of the drawings, the numeral 2 generally indicates a support or base frame for the invention. A suitable motor 4, is adjustably fastened to the support member that connects to and drives a shaft 6 through a belt drive, generally indicated by the numeral 8. The shaft 6 is supported on a bearing housing 10 and the shaft supports a suitable grinding wheel 12. A feature of the invention is to so construct the bearing housing 10, as better illustrated by FIGURE 2, to permit a work area on the left side of the grinding wheel 12 as well as on the right side. This is achieved by making the housing 10 of an inverted L-shape so that the shaft 6 and grinding wheel 12 are mounted in cantilever fashion with space on all sides of the grinding wheel. This permits the saw disc which is being sharpened, to be placed on the left side of the grinding wheel 12, and even under it, as well as on the right side to thereby facilitate the positioning of the saw teeth in relation to the grinding surface of the grinding wheel so as to grind each tooth to the desired angle.

The numeral 14 generally indicates a support arm which is pivotally attached to the support base 2 by means of a bolt 16. Also affixed between the support base 2 and the support arm 14 is a warped half circle or concave-shaped resilient spring member 18 which serves to both hold support 14 in angular relation to support base 2 by spring pressure, and to be gauged in a suitable indexing arrangement in such a manner that the support arm 14 can be resiliently held to form a desired angular relationship with the grinding wheel 12. Welded to the support arm 14 is another suitable support 20 which in turn is welded to a vertical support arm 22.

Slidably affixed to support arm 22 by means of adjustable bolt 24 is a slidable rester 26 which can be adjusted at any point on arm 22 to provide additional support to keep a saw 28 from vibrating while it is being sharpened by the grinder 12. Also supporting the saw is the main supporting plate 30 which is welded to support arm 22. The support plate 30 is constructed so that both sides are angled downwardly from the middle point of the support plate, the angle of inclination on both sides ranging from 15° to 20°. This angle is best illustrated by FIGURE 4. The support plate 30 is angled to permit the operator of the apparatus to place the saw on one side of the plate or the other and bring the saw into proper angular and non-vertical alignment with the grinding wheel 12 so that the pitch and bevel of each tooth on the saw can be sharpened. Such a process will be more clearly explained hereinafter.

The support plate 30, has three longitudinally extending slots positioned therein, best illustrated by FIGURE 1, said slots being generally indicated by the numeral 32.

The support plate 30 has an undercarriage 34 which is riveted to a post 36. The post 36 threadably engages a threaded shaft 38 which is inserted in support arm 40, said support arm being welded to support plate 30. Lock washer 42 holds the threaded shaft 38 in place on one side, while a coil spring 44, positioned in some compression, holds said threaded shaft on the other. Thus shaft 38, although locked firmly in place by spring 44 and washer 42, still can be rotated in either direction by means of a handle 46 placed at the end of said shaft. Since the threaded shaft 38 is threadably engaged with post 36, a turning of the shaft in place by handle 46 to the right will result in undercarriage 34 moving in a direction away from the grinding wheel 12, while a turning of the handle 46 to the left results in the undercarriage slidably moving toward said grinding wheel. The undercarriage 34 also has longitudinally extending slots 80 cut therein, these slots corresponding with the slots 32 in the support plate 30. Each undercarriage slot has a small metal piece welded thereto in the middle of said slot, in effect dividing each slot in two equal halves. The purpose of such slots is to facilitate the sharpening of saws of different diameter with less adjustment of crank 46.

There is also an auxiliary support plate 48 which is permanently positioned on top of support plate 30. The auxiliary plate 48 which is long and narrow, as best illustrated by FIGURES 1 and 4, has the effect of spacing the beveled cutting teeth of a saw being sharpened away from the surface of support plate 30, thereby facilitating rotation of the saw for sharpening as described hereinafter. Auxiliary support plate 48 also has a slot 84 extending longitudinally through its middle portion, said slot corresponding to the similar slots 32, 80, and 82 in support plate 30 and undercarriage 34, respectively.

In the actual process of sharpening a disc saw, or the like, the saw 28 to be sharpened is placed on the plate 48 in the manner indicated in FIGURE 2 and better illustrated by FIGURE 8. A positioner pin, generally indicated by the numeral 54, which includes a support disc 56 and a handle 58, is then inserted through the center hole in the saw, its bottom plug 60 also extending through the corresponding slots 84, 32, and 80 in auxiliary plate 48, support plate 30, and undercarriage 34, respectively, said plug 60 and saw being limited in movement towards the grinding wheel by engaging in position at the end of the forward slot 80 of the undercarriage. As a feature of the invention the plug 60 and saw may be limited in movement away from the grinding wheel by means of an adjustable depth control stop bolt 75, as best seen in FIGURE 7. The bolt 75 is threaded and slidably receives a wedge 75a over the bottom thereof with a threaded handle 75b wedging the bolt 75 into locked relation with the plate 30, plate 48, and undercarriage 34 upon rotation thereof.

The position or radius at which the periphery of the saw engages the grinding wheel to bring the saw to outside diameter is controlled by positioning the bolt 75 to limit the movement of the saw away from the grinding wheel as hereinbefore explained. In this manner, the teeth of the saw to be sharpened are placed in an outside diameter cutting position in relation to the grinding wheel 12, as illustrated by FIGURE 8. Then the operator by gripping the saw on either side with his hands and manually turning the saw can in turn grind each tooth off to an exact outside diameter. The saw can also be gummed or the depth of the teeth made uniform in this operation, if the undercarriage 34 is adjusted to limit the movement of the saw toward the grinding wheel by the position of the forward end of slot 80. Note that this adjustment must be made before setting the bolt 75. Thus, gumming and rounding can be accomplished upon one rotation of the saw because of the adjustable forward and rearward stops provided to limit the sliding movement of the plug 60 in the slots 84, 32 and 80.

After the blade has been rounded and the depth of each tooth gummed or ground to the same length, the operator then uses the apparatus of the invention to sharpen the bevel and the pitch of each individual tooth in the saw. To this end the saw may be tilted from its position on plate 48 to the plane of either side thereof, with the plug 60 of the positioner pin 54 being placed in one of the slots in the angular sides of supporting plate 30. For example, FIGURE 9 illustrates the saw being placed on the left side of support plate 30, looking towards the grinding wheel. The positioner pin is replaced through the center hole of the saw to be sharpened, through the slot 32 in the support plate 30, and slot 82 in the undercarriage 34. Pin or plug 60 is limited in forward movement towards the grinding wheel by engaging against the end of slot 80 in the undercarriage 34. The operator, by turning handle 46 adjusts the undercarriage to properly limit travel of pin 60 in slot 80 so as to limit the depth to which each tooth and all teeth are cut. The operator also may have to make pivotal adjustments in the support arm 14 to bring the teeth of the saw into parallel relationship with beveled cutting edge of the grinding wheel 12. The teeth of the saw normally are made into sets with one set of teeth being inclined or offset from the plane of the saw in one direction and the other set of alternate teeth being inclined in the opposite direction.

More particularly, the operator adjusts support arm 14 to angle P and grinds every tooth edge P, as seen in FIGURE 6, by manually moving the saw in and out and periodically turning the saw to the next tooth while gripping the saw on either side. The angle P insures the proper alignment of the grinding wheel bevel with the edge P of the tooth, and the pin 60 striking the ends of slot 80 insures a uniform depth of cut. Support arm 14 is now changed to angle B and the edge B of each tooth is similarly ground. In this way the operator sharpens the bevel and pitch of every tooth set in one direction.

The operator now transfers the saw from the left side of support plate 30, to the right side, as seen in FIGURE 10, turning the saw 28 on its opposite side as he does so. Of course, if the edges P have been sharpened with the saw centrally positioned on plate 48, the saw will only be turned over, but remain in the same relation to plate 48. Support arm 14 is moved to angle P′ which is equal and opposite to angle P. The position of undercarriage 34 need not be changed. The operator now sharpens all edges P′. Support arm 14 is changed to angle B′, equal and opposite to angle B, and all edges B′ are sharpened.

Should the pitch and bevel of each tooth be equal, as may sometimes be the case in a particular saw, then angles P and B, as well as P′ and B′ become equal. Thus the operation of sharpening a saw, or the like, becomes a process which anyone, with a few minutes of instruction, can do. The limiting movement of the apparatus of the invention makes it impossible, if the apparatus is used correctly, to cut one particular saw tooth farther and deeper than another.

It is also important to note, that since the positioner pin 54 can be placed in either the forward slot 80, the back slot 82, or at the end of the undercarriage 34, saws with large or small diameters can be sharpened on the apparatus of the invention.

The operator usually inserts a washer 70 over the pin 60 which matches the diameter of the center hole in the saw to be sharpened to accurately center the saw on the pin.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. Apparatus to sharpen disc saws or the like including a grinding wheel having a double bevel periphery providing faces making less than a ninety degree angle with each other, a base, means supported on the base and driving the grinding wheel to leave the front and both sides thereof open for placement of the saw in sharpening relation to the grinding wheel, a support plate, means pivotally securing the support plate to the base at right angles to the axis of the grinding wheel, and lying beyond the periphery of the grinding wheel on the side opposite the support means, means slidably mounted on the support plate for rotatably holding a saw disc for sliding movement to and from the grinding wheel in a plane containing the axis of the grinding wheel or in a position tilted left or right out of said plane, means for limiting the sliding movement of said slidable mounted means, to thereby control the depth of the cut on the saw by the grinding wheel, and means to retain the support plate at an angle to present a selected edge of each saw tooth substantially parallel with a selected bevel face of the grinding wheel.

2. Apparatus for sharpening disc saws including a bevel edge grinding wheel, means for rotating the wheel, support means for the disc saw providing for movement of the periphery of the saw into the grinding wheel, said support means including means to hold the saw in a first plane including the axis of the grinding wheel or in planes tilted right and left out of the first plane, means for adjustably limiting movement of the saw towards the grinding wheel, means pivotally mounting the support means on an axis substantially at right angles to the axis of the grinding wheel to provide for adjustment of a selected edge of a saw tooth into substantial parallelism or desired angle with the bevel edge of the grinding wheel, and means to retain the support means in the selected pivotal position.

3. An apparatus to sharpen saws or the like, which includes the combination of a grinding wheel, driving means for said grinding wheel, supporting means for said driving means, a support plate, pivotally attached to said supporting means, said supporting plate having two flat surfaces angled to each other with both surfaces inclining downwardly from the middle, said inclination being from 15° to 20°, the angled surfaces having longitudinally extending slots therein, an undercarriage having a plurality of aligned elongated slots therein, said undercarriage slidably positioned under the supporting plate whereby the slots of both plates are in alignment, means for slidably moving said undercarriage forward and backward under said supporting plate, and a positioner pin, said positioner pin being stabbed through said slots in said support plate and undercarriage, and being limited in forward movement by the end of the slots in said undercarriage, said pin thus retaining a saw or the like on said support plate, permitting it to be slidably moved in relation to said grinding wheel.

4. An apparatus to sharpen saws or the like, which includes the combination of a grinding wheel, driving means for said grinding wheel, supporting means for said driving means, a support plate, positioned in relation to said grinding wheel pivotally attached to said supporting means, said supporting plate being formed in an inverted V-shape, where the inclination of both sides is between about 15° to about 20° from a horizontal plane, the sides having longitudinally extending parallel slots positioned therein, an undercarriage having interrupted elongated parallel slots therein being slidably positioned under the support plate whereby the slots thereof are in alignment with the slots of said support plate, means for slidably moving said undercarriage forward and backward in parallel relation under said supporting plate, and a positioner pin removably holding a saw to be sharpened on the support plate, said positioner pin being selectively stabbed through one of said slots in said support plate, and being limited in forward movement by engaging the end of the respective interrupted slot in the undercarriage in which it is received.

5. An apparatus according to claim 4 which includes an auxiliary support, removably placed in fixed relation on top of said support plate so as to be in alignment with the rotating axis of the grinding wheel which is designed to provide a horizontal plane on which the saw to be sharpened is held by the positioner pin to effect a true rounding of the saw as it is rotated about the pin and in engagement with the grinding wheel.

6. An apparatus according to claim 4 which includes a concave-shaped resilient spring member with a suitable indexing arrangement, attached to said supporting means and resiliently engaging said support plate, to provide both additional support for said support plate and resilient means for locking said support plate in fixed angular relationship to said grinding wheel.

7. Apparatus for sharpening disc saws including a bevel edge grinding wheel, means for rotating the wheel, support means for the disc saw providing for the movement of the periphery of the saw into the grinding wheel, said support means including means to hold the saw in a plane tilted right and left to the axis of the grinding wheel, means for adjustably limiting movement of the saw towards the grinding wheel, means for adjustably limiting movement of the saw away from the grinding wheel, means pivotally mounting the support means on an axis substantially at right angles to the axis of the grinding wheel to provide for adjustment of a selected edge of a saw tooth into substantial parallelism or desired angle with the bevel edge of the grinding wheel, and means to retain the support means in the selected pivotal position.

No references cited.

GRANVILLE Y. CUSTER, Jr., *Primary Examiner.*